United States Patent
Shiohara

(10) Patent No.: US 8,964,094 B2
(45) Date of Patent: Feb. 24, 2015

(54) IMAGING DEVICE, IMAGING METHOD AND IMAGING PROGRAM FOR PRODUCING IMAGE DATA ON THE BASIS OF A PLURALITY OF SIGNALS TRANSMITTED FROM AN IMAGE ELEMENT

(75) Inventor: Ryuichi Shiohara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 953 days.

(21) Appl. No.: 12/959,146

(22) Filed: Dec. 2, 2010

(65) Prior Publication Data

US 2011/0128433 A1 Jun. 2, 2011

(30) Foreign Application Priority Data

Dec. 2, 2009 (JP) ................................. 2009-274822

(51) Int. Cl.
*H04N 5/222* (2006.01)
*H04N 5/262* (2006.01)
*H04N 5/232* (2006.01)
*H04N 5/345* (2011.01)

(52) U.S. Cl.
CPC .......... *H04N 5/23293* (2013.01); *H04N 5/3454* (2013.01); *H04N 5/3456* (2013.01)
USPC .................................. 348/333.12; 348/240.2

(58) Field of Classification Search
None
See application file for complete search history.

(56) References Cited

U.S. PATENT DOCUMENTS

| | | | |
|---|---|---|---|
| 7,230,648 B2 * | 6/2007 | Ueno | ............................ 348/340 |
| 2001/0024234 A1 | 9/2001 | Kubo | |
| 2003/0193600 A1 * | 10/2003 | Kitamura et al. | ........ 348/333.01 |
| 2004/0061797 A1 * | 4/2004 | Takahashi et al. | ....... 348/333.01 |
| 2004/0212714 A1 * | 10/2004 | Mikoshiba et al. | ...... 348/333.11 |
| 2007/0030374 A1 * | 2/2007 | Ishii | .......................... 348/333.01 |
| 2007/0195182 A1 | 8/2007 | Ito | |
| 2007/0222877 A1 | 9/2007 | Kurane | |
| 2008/0079817 A1 * | 4/2008 | Murata et al. | ............... 348/222.1 |
| 2008/0259196 A1 | 10/2008 | Bloom et al. | |
| 2009/0021621 A1 * | 1/2009 | Hashimoto et al. | ........... 348/300 |
| 2009/0066782 A1 | 3/2009 | Choi et al. | |
| 2009/0185064 A1 * | 7/2009 | Maniwa | .................... 348/333.11 |
| 2009/0295932 A1 * | 12/2009 | Ichii et al. | .................. 348/220.1 |
| 2010/0007784 A1 * | 1/2010 | Haneda | .......................... 348/347 |

FOREIGN PATENT DOCUMENTS

| | | |
|---|---|---|
| JP | 2001-275028 A | 10/2001 |
| JP | 2005-328225 A | 11/2005 |
| JP | 2006-121299 A | 5/2006 |
| JP | 2006-222979 A | 8/2006 |
| JP | 2008-109405 A | 5/2008 |
| JP | 2008-252648 A | 10/2008 |
| JP | 2009-272703 A | 11/2009 |
| WO | WO 2008/136007 A2 | 11/2008 |

\* cited by examiner

*Primary Examiner* — Justin P Misleh
(74) *Attorney, Agent, or Firm* — Kilpatrick Townsend & Stockton LLP

(57) ABSTRACT

An imaging device produces images on the basis of signals, transmitted from an imaging element. The device includes a display controller which selectively carries out either a first or a second display process, based on a user's selection. The first display process includes obtaining a first portion of the signals from a first area of the imaging element at a first frame rate, and displaying a first through-the-lens image on the display unit on the basis of the first portion of the signals. The second display process includes obtaining the first portion of the signals from the first area of the imaging element at a second, lower frame rate; obtaining a second portion of the signals from a second area of the imaging element at the lower frame rate; and displaying a second through-the-lens image on the display unit on the basis of both portions of the signals.

16 Claims, 6 Drawing Sheets

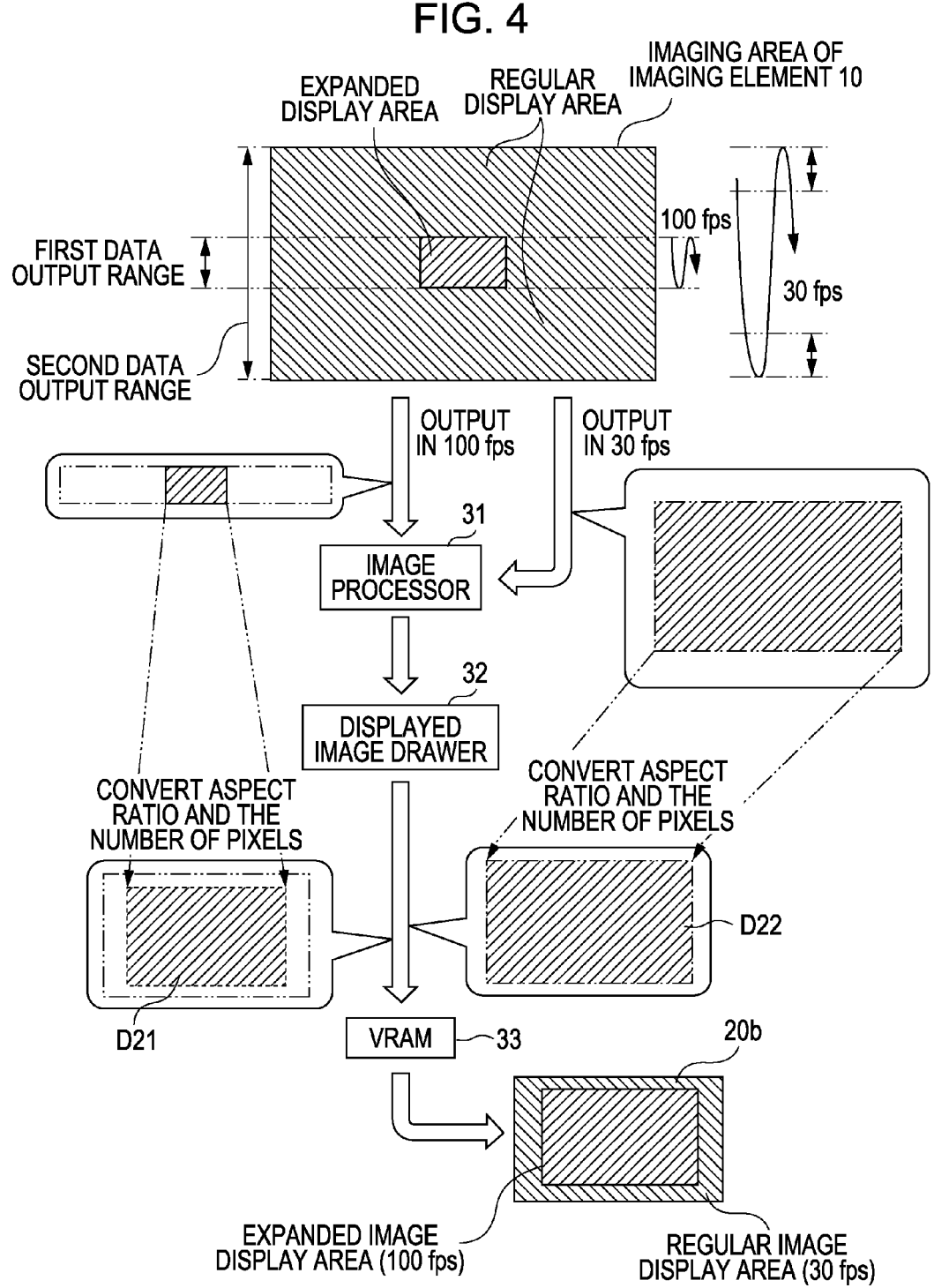

IMAGING DEVICE, IMAGING METHOD AND IMAGING PROGRAM FOR PRODUCING IMAGE DATA ON THE BASIS OF A PLURALITY OF SIGNALS TRANSMITTED FROM AN IMAGE ELEMENT

CROSS REFERENCES TO RELATED APPLICATIONS

This application claims priority to, and is based on, Japanese Patent Application No. 2009-274822, filed Dec. 2, 2009, the entire disclosure of which is hereby incorporated by reference.

BACKGROUND

1. Technical Field

The present invention relates to an imaging device, an imaging method and an imaging program in which an imaging element produces image data on the basis of light received from an object.

2. Related Art

Digital still cameras (shortened as DSC, hereafter) have come into wide use in recent years, and are often used in place of photographic film cameras. Professional photographers and experienced amateurs, however, are not satisfied with DSCs in lots of respects, and the DSC has not fully taken over for film cameras. Thus, the DSC is still being refined so as to meet such user's demands. One of such refinements is to provide a function for magnifying and displaying a portion of a through-the-lens image, so as to solve a problem caused by a low resolution performance of a display for displaying the through-the-lens image in that the extent to which the image is in focus on the display cannot be ensured, as disclosed in JP-A-2006-222979 and JP-A-2005-328225. For example, when photographing a person in a full-body shot, the person's face may be magnified on the display screen, blocking a portion of the background. While the expanded image is displayed on the display screen or electronic viewfinder, hitting the shutter button captures the entire, unmodified image.

Another problem of the DSC is delay time in various processes after an object is photographed by means of an imaging element and until a through-the-lens image is displayed.

FIG. 3B illustrates a time lag between a truly recorded image and a preview image after and before a shutter of an ordinary DSC is released. As illustrated in FIG. 3B, an imaging element, a Video Random Access Memory (VRAM) and a display of an imaging device cause a "reading delay", a "writing delay" and a "display delay", respectively. The "reading delay" is a period of time required after completion of exposure of the imaging element and before completion of output of signal electric charges of the imaging element. The "writing delay" is a period of time required for image data of one screen on the display to be written to the VRAM. The "display delay" is a period of time required for an image of one screen to be displayed on the display.

An imaging element of a frame rate of, e.g., 60 frames per second (fps) may cause a "reading delay" of nearly 16.7 ms in some cases. Further, an image displayed in accordance with the National Television System Committee (NTSC) standard is subjected to a "display delay" of nearly 33.3 ms per one screen as the frame rate is nearly 30 fps. Further, the VRAM causes a "writing delay" according to its writing speed, though this is much smaller than the "reading delay" or the "display delay" at present. Thus, when a user releases the shutter while viewing the preview screen in those cases, it is supposed that a delay of at least 50.0 ms has already been caused. In addition, an "imaging process delay" is caused as well, as the DSC carries out a process preparatory to imaging. In those circumstances, it is difficult for an ordinary DSC to photograph an object at the precise instant desired by the user, possibly resulting in failure to photograph the object.

SUMMARY

An advantage of some aspects of the invention is to provide an imaging device, an imaging method and an imaging program which reduce a time lag between an image displayed on a display and a recorded image, so that an object can be photographed closer to the precise instant desired by the user, and that failure to photograph the object is minimized.

In order to solve the above problem, according to an aspect of the invention, an imaging device produces image data on the basis of a plurality of signal electric charges. The electric charges are transmitted from an imaging element, which performs optical/electrical (O/E) conversion from light received from an object. The imaging device has a display unit which displays an image, and a display controller which selectively carries out either a first display process or a second display process, based on a user's selection. The first display process includes obtaining a first portion of the signal electric charges from a first area of the imaging element at a first frame rate, and displaying a first through-the-lens image on the display unit on the basis of the first portion of the signal electric charges. The second display process includes obtaining the first portion of the signal electric charges from the first area of the imaging element at a second frame rate, which is lower than the first frame rate; obtaining a second portion of the signal electric charges from a second area of the imaging element at the second, lower frame rate; and displaying a second through-the-lens image on the display unit on the basis of the first and second portions of the signal electric charges.

In other words, the first display process can, in some embodiments, display only a portion of the image that will eventually be captured and saved once the shutter is depressed, such as a magnified portion of an element deemed particularly relevant, like the face of a person being photographed in full-body mode. This is done at a high frame rate so the photographer can capture the image at a precise, desired moment. In some embodiments, as will be described in detail later, other portions of the image are also displayed in the first display process.

When the photographer does not wish to see only a portion of the image, he or she can select the second display process, which, in some embodiments, is a "normal mode," which displays the entire image that will eventually be captured and saved upon depression of the shutter.

In some embodiments, the first area and the second area together make up the entire imaging element. However, it is unnecessary to obtain the signal electric charges from all of the pixels included in the first and second areas, and the first and second display processes can include a process for obtaining the signal electric charges from selected ones of the pixels. It may be preferable to choose the pixels evenly from the target area (i.e. the first or second area) from which the signal electric charges are obtained.

In the first and second display processes, the display controller obtains signal electric charges produced in a particular area of the imaging element (either the first or the second area) in order to obtain the signal electric charges produced by the imaging element by means of the O/E conversion. Thus, the display controller can ignore those of the signal electric charges produced in areas other than the above particular area both in obtaining the signal electric charges and in displaying the first and second through-the-lens images. Thus, a time lag between the first through-the-lens image displayed on the display unit and a recorded image can be reduced.

Further, the frame rates of the first through-the-lens image and the second through-the-lens image are different from each other. Thus, the signal electric charges are obtained from an area which is relevant at the time of imaging for a user at a higher frame rate, so that the image based on these signal electric charges is displayed at a higher frame rate. The signal electric charges are obtained from an area which is less relevant at a lower frame rate, so that the image based on these signal electric charges is displayed at a lower frame rate. Thus, a time lag for an image of a relevant area between the first through-the-lens image displayed on the display unit and a recorded image can be reduced.

In some embodiments, in the second display process, the display controller displays the first through-the-lens image with a higher magnification than the second through-the-lens image. As described above, the first through-the-lens image is displayed at a higher frame rate than the second through-the-lens image. As being more relevant than an image to be displayed less frequently, the image to be displayed frequently as described above should be clear and observable in detail. Thus, if the first through-the-lens image is displayed with a higher magnification than the second through-the-lens image, detailed observation in the first area is facilitated for the user, preventing failure to photograph the object.

In some embodiments, the display controller starts to obtain the signal electric charges of the first display control process at a position apart from a position at which it starts to obtain the signal electric charges of the second display control process. In the first display control process, the display controller cannot start the process of displaying the first through-the-lens image until it finishes obtaining the signal electric charges in the first area. Further, a period of time for which an imaging element reads and scans signal electric charges is longer as the number of pixels to be scanned is larger. Thus, if all the pixels of the imaging element are read and scanned, a period of reading time is longer. If there is a portion to be read earlier than the first area in the order of the above read-and-scan operation, the display controller starts and finishes scanning the first area later. Thus, in the first display process, the display controller controls the imaging element so as to start the read-and-scan operation at a position apart from a position at which the display controller starts to obtain the signal electric charges of the second display control process. The separate position is between the position at which the display controller starts to obtain the second area's signal electric charges and the position before a front position for reading the first area. The signal electric charges in the first area are thereby obtained faster, and a time lag between the first through-the-lens image displayed on the display unit and the recorded image is reduced.

In some embodiments, the display controller starts displaying the first through-the-lens image upon finishing obtaining the signal electric charges in the first area from the imaging element. That is, even if the display controller continues the read-and-scan operation on another area of the imaging element after finishing obtaining the signal electric charges in the first area, the display controller starts displaying the first through-the-lens image on the display unit without waiting for completion of the read-and-scan operation. The time lag between the first through-the-lens image displayed on the display unit and the recorded image is thereby reduced.

In some embodiments, the display unit displays the image in the second display process at a frame rate lower than the frame rate at which it displays the image of the first display process.

In some embodiments, the display unit displays the images of the first and second display processes at the same frame rate, and displayed content of the second through-the-lens image is less frequently updated than displayed content of the first through-the-lens image.

In some embodiments, the first display process displays the first through-the-lens image on a portion of the display unit on the basis of the signal electric charges obtained only from the first area at the first frame rate, and also displays a third through-the-lens image on another portion of the display unit on the basis of the signal electric charges obtained from the pixels included in the second area at the second frame rate. Displayed content of the first through-the-lens image may be more frequently updated than displayed content of the third through-the-lens image. Thus, while the time lag between the first through-the-lens image displayed on the display unit and the recorded image is reduced, the image in the second area can be grasped in outline.

In other words, the "relevant" portion of the image can in some embodiments be displayed at a high frame rate, superimposed on a background of the less relevant portion of the image, at a lower frame rate.

The imaging device described above can be variously implemented in another apparatus integrated therein or in association with another method. Further, the invention can be implemented as an imaging system provided with the imaging device, an imaging method including the steps which correspond to the configuration of the device described above, an imaging program for implementing the functions which correspond to the configuration of the device described above, and a computer-readable recording medium in which the program is recorded. The inventions of the imaging system, the imaging method, the imaging program and the medium in which the program is recorded operate and have the effects as described above.

BRIEF DESCRIPTION OF THE DRAWINGS

The invention will be described with reference to the accompanying drawings, wherein like numbers reference like elements.

FIG. 4 illustrates a second exemplary embodiment of data flow.

DESCRIPTION OF EXEMPLARY EMBODIMENTS

Embodiments of the invention will be explained in order as follows.
(1) Configuration of an exemplary imaging device;
(2) First exemplary embodiment of expanded display;
(3) Second exemplary embodiment of expanded display;

(4) Third exemplary embodiment of expanded display;
(5) Fourth exemplary embodiment of expanded display; and
(6) Overview.

(1) Configuration of an Exemplary Imaging Device

In one embodiment, a piece of image information is obtained from an expanded display area, i.e., part of an imaging area of an imaging element, and an image in the expanded display area is expanded and displayed on a display unit on the basis of the image information. The image data which originates the expanded image displayed at this time is made by controlling the imaging element so that pixels necessary for displaying the expanded image are given priority to output the image information, rather than that image data obtained from the entire imaging area of the imaging element is partially cut out. Thus, the device may be configured as follows.

Figure 1:
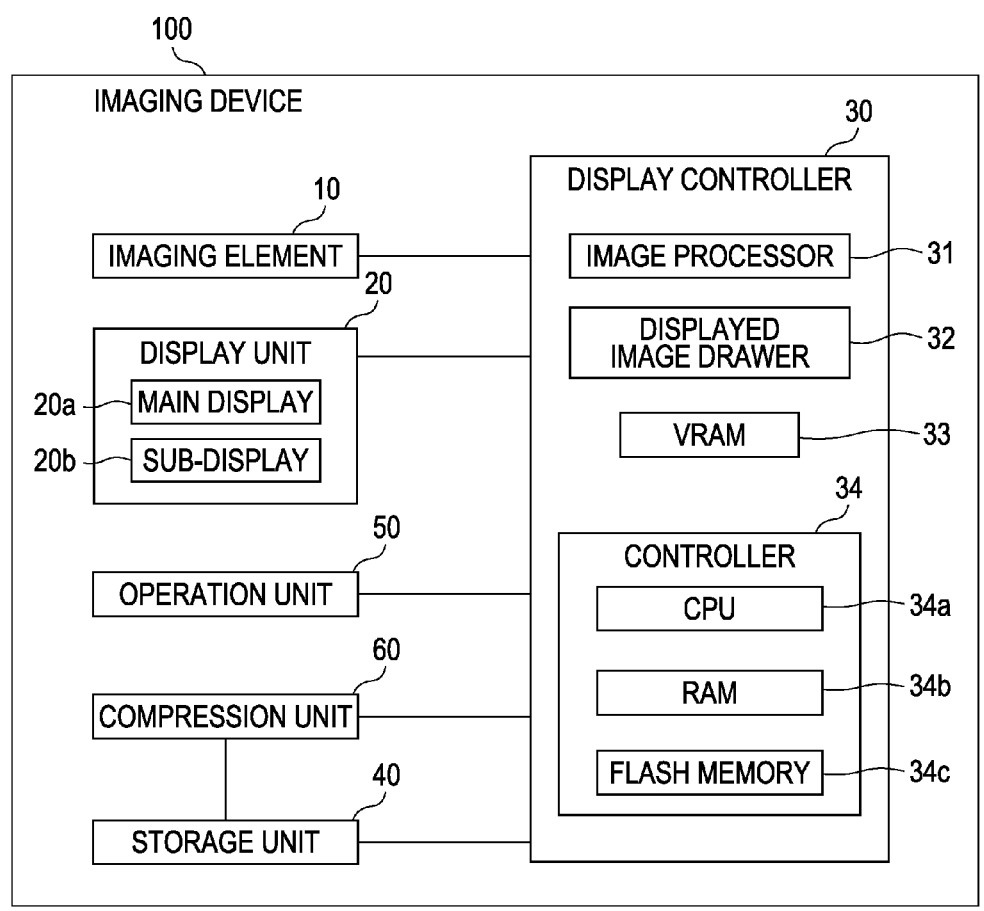
FIG. 1 is a block diagram of an exemplary imaging device.

FIG. 1 is a block diagram for illustrating an exemplary configuration of the device. An imaging device 100, such as a digital still camera, has an imaging element 10, a display unit 20, a display controller 30, a storage unit 40, an operation unit 50 and a compression unit 60, as shown in FIG. 1. The imaging device 100 produces image data on the basis of light received from an object by the imaging element 10, displays an image on the display unit 20 on the basis of the image data in accordance with an operation done in the operation unit 50, and stores the image data in the storage unit 40.

The imaging element 10 outputs an electric signal representing an image according to an amount of light received on a light receiving face, and can output an electric signal from pixels of the light receiving face. The imaging element 10 can be, e.g., a single- or three-plate charge-coupled device (CCD), or an active-pixel sensor (APS) such as a complementary metal-oxide-semiconductor sensor (CMOS APS or CMOS sensor). A plurality of optical/electrical (O/E) converter elements is provided on the light receiving face. The imaging element 10 produces an image signal on the basis of electric charges which the O/E converter elements have individually accumulated by means of O/E conversion. Between the light receiving face and the object is an optical system (not shown), which may include a group of lenses, a diaphragm, etc. The group of lenses and the diaphragm can be controlled by a driving mechanism (not shown), so that where to position or to what extent to stop down the lenses can be adjusted. The display controller 30 can control the driving mechanism so that brightness of an optical image projected on the light receiving face of the imaging element 10 can be adjusted or the optical image can be formed while the focus of the image is adjusted.

An example of the imaging element 10 described above is a CCD image sensor of an interline type, which is a single-plate imaging element, and its configuration will be explained in brief. A single-plate imaging element is provided with color filters for producing color image data on a light receiving face. The color filters include primary color filters of R (red), G (green) and B (blue), and complementary color filters of C (cyan), M (magenta), Y (yellow) and G (green). The primary color filters may be arranged as a Bayer filter mosaic. Alternatively, O/E converter elements which form color filters or imaging elements can take on various arrangements such as lattice or honeycomb arrangements.

The interline type CCD image sensor includes photosensitive arrays each including a plurality of photodiodes arranged in a line and vertical transfer CCD arrays each including a plurality of CCDs arranged in a line. The photosensitive arrays and the vertical transfer CCD arrays are alternately disposed, and a horizontal transfer CCD array is provided along one end portion of the respective vertical transfer CCD arrays. Further, the photodiode of each pixel and each element of the vertical transfer CCD arrays which corresponds to the pixel, are connected by a transfer gate which works as an analog switch. Further, an output circuit which converts signal electric charges into a voltage signal is connected to an end portion of the horizontal transfer CCD array.

Rows of these plural vertical transfer CCD arrays or of the transfer gates from which data is output or data is not output can be specified by means of a driving signal, so that an image output range in the vertical direction can be limited. That is, the display controller 30 can control the CCD image sensor 10 to selectively output image signals from specified rows or from all of the rows. Alternatively, a CMOS image sensor can carry out the output operation such that ranges from which image signals are output are limited in both rows and columns.

The display controller 30 produces image data D1 on the basis of the voltage signal output from the entire imaging element 10 as described above, and outputs the image data D1 to the display unit 20.

The display unit 20 of the embodiment shown in FIG. 1 has a main display 20a and a sub-display 20b. The main display 20a is mainly used for displaying a photographed image or a menu screen for accessing various settings of the imaging device 100. The sub-display 20b is used for checking how an image is composed or focused by displaying an optical image provided by an optical system. The display unit 20 has a display controller for controlling a display on the main display 20a, and has another display controller for controlling a display on the sub-display 20b. The display controller 30 provides each of the display controllers with image data, so as to display an image based on desired image data on the main display 20a or on the sub-display 20b.

The main displays 20a, 20b may be, for example, liquid crystal displays, organic electroluminescent displays, cathode-ray tube displays, or plasma displays. Further, although the sub-display 20b will be described in detail below as an Electric View Finder (EVF), use of a sub-display provided for another purpose is not excluded.

Further, the display controller 30 has an image processor 31, a displayed image drawer 32 and a video random access memory (VRAM) 33. The image processor 31 carries out various image processes on the image data provided by the imaging element 10, so as to produce image data to be used for a display. The display controller 30 may have an analog front end (AFE), a demosaicing unit, a linear matrix unit and a gamma correction unit.

The AFE carries out analong/digital (A/D) conversion for quantizing the electric signal provided by the imaging element and converting that into a digital image signal. The demosaicing unit carries out a process for complementing each of pixels of a color image signal obtained from a single plate imaging element lacking a color component on the basis of pixel values of surrounding pixels. The linear matrix unit multiplies an input RGB signal by coefficients in a 3×3 matrix, and outputs an RGB signal for providing preferable color reproduction on the display. The gamma correction unit carries out gamma correction on the RGB signal to display an image in accordance with a correct gradation characteristic on a display having a particular gamma characteristic.

The produced image data D1 (FIG. 2) on which the image processes have been carried out by the respective devices described above is provided to the displayed image drawer 32 while a user is adjusting how a through-the-lens image is composed or focused, i.e., before a shutter button in the operation unit 50 is released. Such a state is called a preview mode, hereafter.

The displayed image drawer 32 scales the image data D1 provided by the image processor up or down so as to fit the image to an aspect ratio or the number of pixels of the display unit 20 or of a display area in the display unit 20 for producing image data D2 to be displayed for a preview use, and stores the image data D2 in the VRAM 33. Alternatively, the image data D2 to be displayed for the preview use can be synthesized, so that setting data being set or measurement data of something measured can be displayed. The imaging element 10 periodically captures images in the preview mode, and produces new image data D1 at regular intervals. The displayed image drawer 32 produces the image data D2 to be displayed every time the new image data D1 is produced, and updates the image data D2 to be displayed stored in the VRAM 33.

The image data D2 to be displayed stored in the VRAM 33 as described above is suitably input to the display controller of the sub-display 20b in the preview mode, and a preview image is displayed on the sub-display 20b. That is, following a photographing condition such as photographed area being changed, a changed image is displayed on the sub-display 20b. Such a preview can be done on the main display 20a as a matter of course. The display controller 30 can choose any combination of the main display 20a and the sub-display 20b as to where the preview is done in accordance with an operation done on the operation unit 50.

Meanwhile, if the user selects how the through-the-lens image is composed and releases the shutter button, the produced image data D1 is output to the compression unit 60. Such a state is called a recording mode, hereafter.

The compression unit 60 compresses the image data D1 to produce compressed image data as controlled by the display controller 30. The compression format can be irreversible compression such as to a JPEG format or reversible compression such as to a portable network graphing (PNG) format. Alternatively, the compression unit 60 can output the image data in a bitmap format without compression. The compressed or uncompressed image data produced as described above is output to the storage unit 40. In yet a further alternative embodiment, upon the shutter button being released, the display controller 30 can output RAW data, i.e., image data output from the AFE before being demosaiced, directly to the storage unit 40 as it is, bypassing the compression unit 60.

The display controller 30 controls the respective components of the imaging device 100 as described above by using a controller 34 as a core controller which controls the entire imaging device 100 in accordance with a specific program. The controller 34 can include, e.g., a central processing unit (CPU) 34a (operation processing unit), a random access memory (RAM) 34b (volatile semiconductor memory), and a flash memory 34c (nonvolatile semiconductor memory) interconnected with one another by a communication bus. The CPU 34a may control the operation of the device 100 by running an imaging program stored in the flash memory 34c while using the RAM 34b as a working area.

Further, the operation unit 50 for various operations to be input to the controller 34 is provided with operation input means such as a button, a switch and a dial. The user operates these operation input means in a specific manner so as to input a control signal of the operation to the controller 34, and the controller 34 carries out a control process according to the control signal.

(2) First Embodiment of Expanded Display

Figure 2:
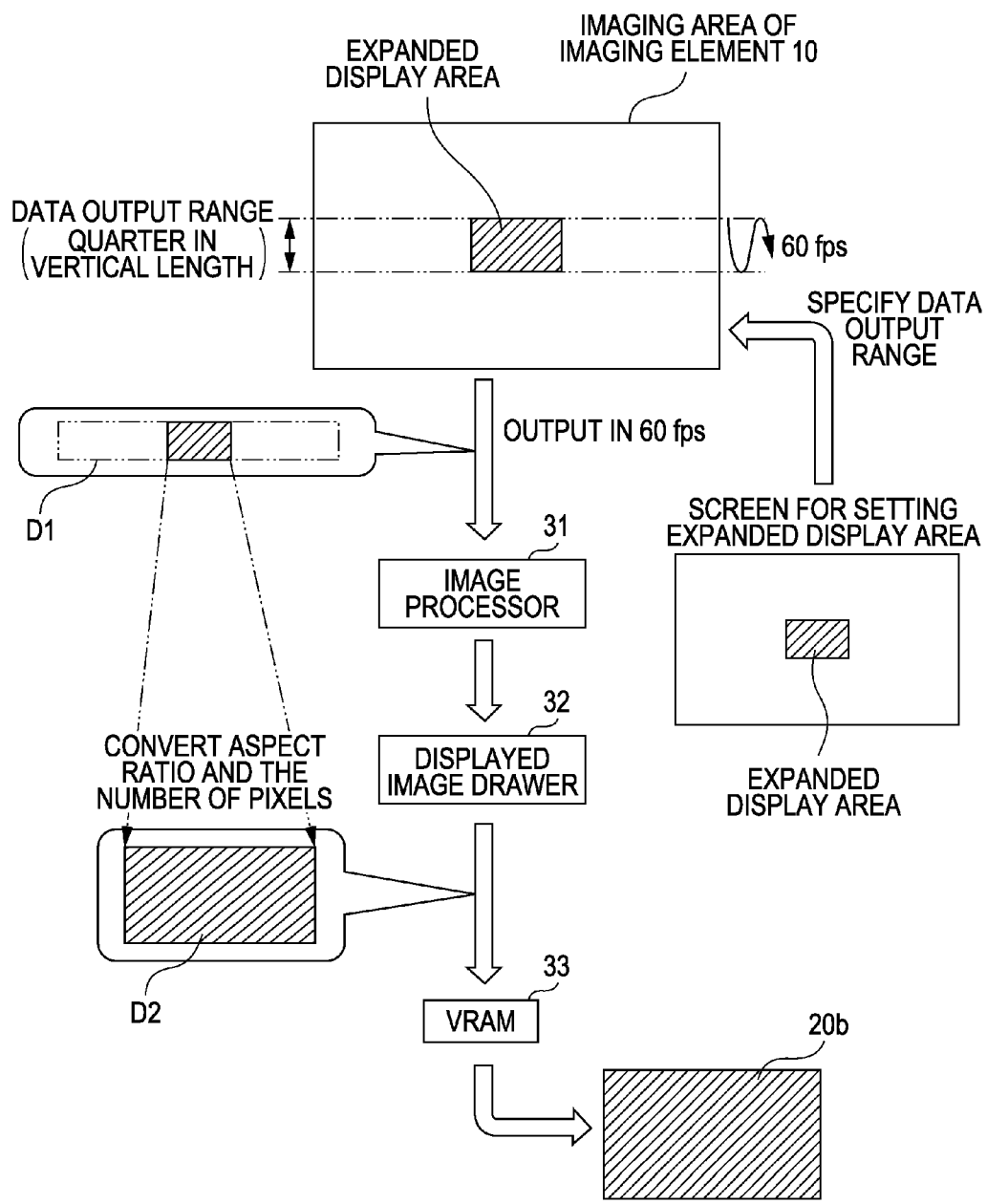
FIG. 2 illustrates a first exemplary embodiment of data flow.

FIG. 2 illustrates a data flow of a first embodiment of an expanded display carried out by the imaging device 100.

As illustrated in FIG. 2, the display controller 30 specifies an expanded display area of the imaging element 10. As resolution (the number of pixels) of the imaging element 10 is higher than resolution (the number of pixels) of the display unit 20 in general, resolution of an image captured by the imaging element 10 is generally lowered in order that the image is displayed on the display unit 20. However, in the expanded display area of the imaging element 10, a specific part of the image is converted into higher resolution than that of the remainder of the image display. In the case of the expanded display, the image is in some embodiments displayed with a higher magnification than in the case of the entire image display. Incidentally, the image is not always converted into lower resolution, and is converted into higher resolution if the number of the pixels included in the expanded display area is lower than the resolution of the display unit 20. Further, if the number of the pixels included in the expanded display area equals the resolution of the display unit 20, the resolution is not converted.

The expanded display area is, e.g., a focusing area in which to what extent an object included in the area is in focus is estimated, a digital zooming area in which an expanded image is produced by means of a digital process, etc. The expanded display area can be a fixed area, or an area to be set upon the user doing a particular operation on the operation unit 50. Further, the user can change settings of a position, an area, size and the number of the expanded display area. If the user changes a setting, the display controller 30 instructs the imaging element 10 to change the expanded display area. The expanded display area forms a first area of the embodiment.

Meanwhile, if the user does not set an expanded display, the display controller 30 specifies no expanded display area for the imaging element 10. If no expanded display area is specified, the imaging element 10 outputs image data obtained from the entire imaging element 10, and the display controller 30 thereby displays an image to be displayed on the sub-display 20b on the basis of the image data. That is, according to the first embodiment, a portion of the entire area of the imaging element 10 excluding the first area forms a second area.

Meanwhile, if a particular operation is done on the operation unit 50, the display controller 30 switches between the expanded display and a regular display. That is, the operation unit 50 forms a switching unit.

If the expanded display area is set, the display controller 30 selectively obtains an image signal for drawing the expanded display area from the imaging element 10. The imaging element 10, e.g., selects an area necessary for forming an image of the expanded display area including the expanded display area as a data output range, and selectively outputs signal electric charges accumulated only on the photodiodes in the data output range, but does not output signal electric charges accumulated on the photodiodes in other areas. The display controller 30 can let the signal electric charges accumulated on the photodiodes in areas other than the data output range discharge without obtaining them. Incidentally, as line output is of a primary output form for a CCD, the rows are selected as the data output range in FIG. 2. That is, if the imaging element 10 is of a CCD-like line output type, an area including continuously selected plural rows forms the first area of the embodiment. If the data output range can be specified by both rows and columns such as for a CMOS, an area including continuously selected plural pixels forms the first area.

If the imaging element 10 outputs an image signal in the data output range, the image processor 31 carries out various image processes so as to produce the image data D1. Then, the displayed image drawer 32 produces the image data D2 to be displayed on the basis of the image data D1, and stores the image data D2 in the VRAM 33. Alternatively, if an area other than the expanded display area is included in the data output range, such as if the imaging element 10 is a CCD, the unnecessary portion is removed at one of stages of the processes carried out by the image processor 31 and the displayed image drawer 32. Then, the displayed image drawer 32 carries out processes of aspect ratio conversion and the number of pixels conversion as necessary so that the image data in the expanded display area fits the sub-display in the aspect ratio and the number of pixels, and stores the converted image data in the VRAM 33. As a result, only the image in the expanded display area is displayed, such as on the entire screen of the sub-display 20b, but of course it can be displayed on only a portion of the screen.

A control operation such as displaying the image in the expanded display area on the entire screen corresponds to a first display process of the embodiment. Further, a control operation such as displaying the image from the entire area of the imaging element 10, such as on the entire screen, corresponds to a second display process of the embodiment. The display controller 30 does not necessarily display the image on the entire screen as a matter of course, and can select a portion of the screen as the display area. The images displayed on the display unit by means of the first display process and by means of the second display process form a first through-the-lens image and a second through-the-lens image, respectively.

To summarize, in this first exemplary embodiment, a user can choose to display in the first display process, in which only the expanded image is shown, and the second display process, in which the entire image is shown. Pushing the shutter in either of these modes records the entire image.

Figure 3A:
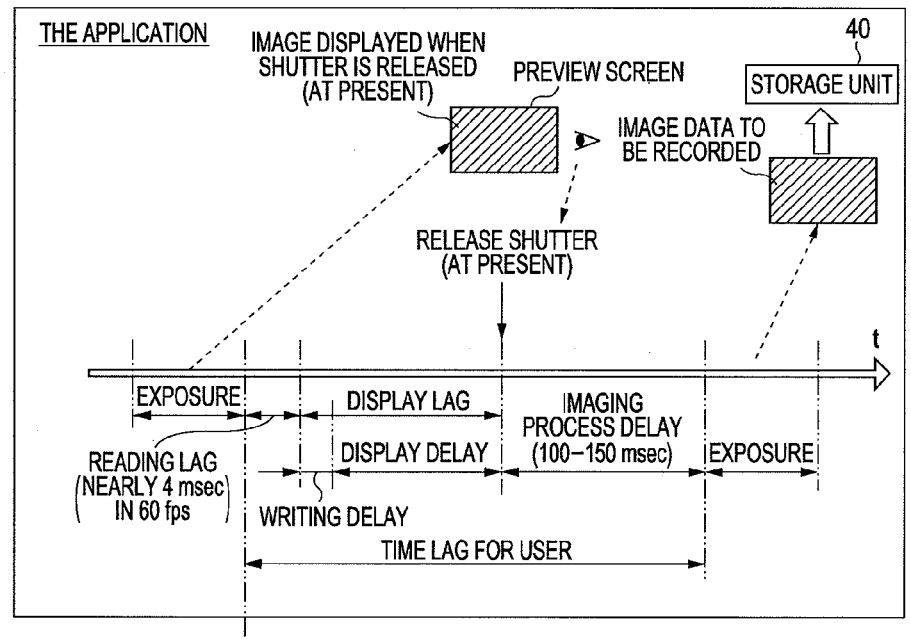
FIG. 3A illustrates a time lag between imaging and preview according to exemplary embodiments.
Figure 3B:
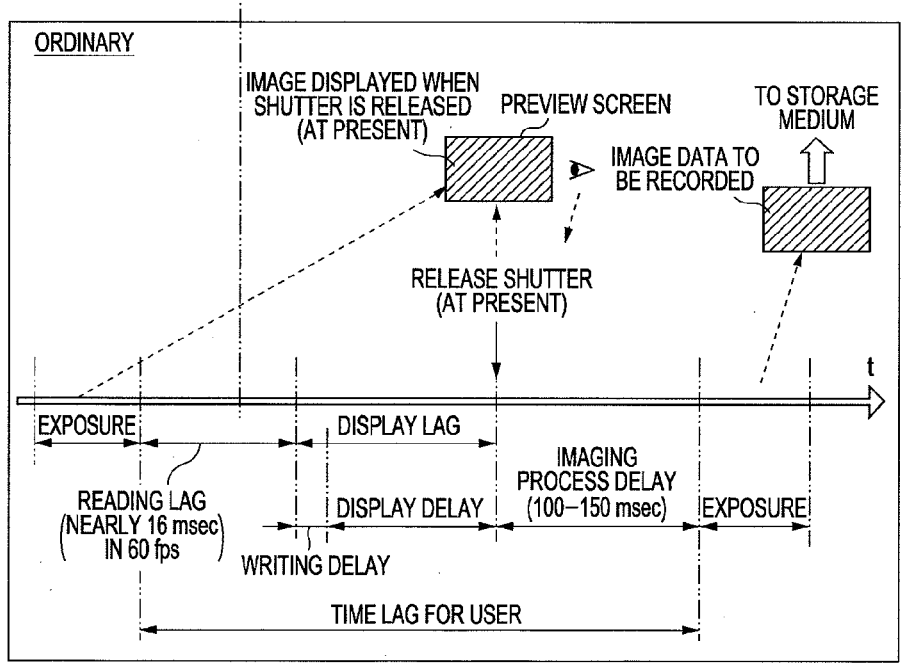
FIG. 3B illustrates a time lag between imaging and preview according to the prior art.

A time lag between image capturing and a preview operation will now be explained with reference to FIGS. 3A and 3B. FIG. 3A illustrates a time lag in an exemplary inventive imaging device 100, and FIG. 3B illustrates a timing lag of the prior art. FIG. 3A shows a case in which the image signal is output only from the data output range. Thus, it is known that a period of reading time of the imaging element decreases, and that the time lag between image capturing and the display decreases. Further, as a period of time for a reading scan per one frame is shortened, the frame rate of the imaging element can be made higher. The higher frame rate contributes to reducing the time lag between a true image and a preview image, so that an image at a moment closer to an instantaneous image that the user has intended to capture can be recorded.

(3) Second Embodiment of Expanded Display

FIG. 4 illustrates a data flow of a second exemplary embodiment of the expanded display carried out by the imaging device 100. According to this embodiment, while an expanded display is going on, a remaining area which is not used for the expanded display is used for a regular display. Further, an image drawn in the expanded area is updated more frequently than an image drawn in the remaining area.

As illustrated in FIG. 4, a first data output range and a second data output range are set to the imaging element 10. The first data output range is a fixed range or a range set by a user via the operation unit 50 and including the expanded display area, similarly as for the first embodiment. The second data output range may be the entire area of the imaging element 10. Alternatively, the second data output range can be selected, as long as the second data output range includes the above first data output range and the immediately surrounding area of the first data output range, etc.

Further, image data is obtained in different frame rates from the first data output range and from the second data output range from each other. The frame rate is determined in accordance with relevance of areas, i.e., higher in a more relevant area, such as a face or other object to be focused on. In FIG. 4, the frame rate from the first data output range, which is relevant for a photographer in order to select how an image is composed or focused, is 100 fps. The frame rate from the second data output range which is less relevant for the photographer, is 20 fps. These frame rates are merely exemplary and should not be considered exhaustive. As the frame rate varies with the relevance of the areas, an area being more relevant is previewed at a higher updating rate. Thus, the time lag between the preview of a relevant area and a true object to be photographed can be reduced.

The image processor 31 and the displayed image drawer 32 store image data D22 to be displayed of an aspect ratio and the number of pixels fitted to the sub-display 20b on the basis of an image signal obtained from the second data output range in 20 fps in the VRAM 33. Meanwhile, the image processor 31 and the displayed image drawer 32 obtain image signals from the first data output range five times while obtaining the image signal from the second data output range, produce image data D21 to be displayed of an aspect ratio and the number of pixels fitted to the sub-display 20b on the basis of the obtained image signals, and stores the image data D21 in the VRAM 33. For instance, they obtain image signals from the first data output range four times, and then obtain image signals from the first data output range and the second data output range simultaneously.

The display controller 30 draws the expanded image display area shown in FIG. 4 at one updating rate displaying the image data D21, and draws the regular image display area shown in FIG. 4 on the basis of the image data D22 to be displayed. Then, the expanded image display area and the regular image display area are updated at higher and lower rates, respectively. Thus, the time lag between the true image and the preview image of a relevant portion can be reduced, so that an image at a moment closer to an instantaneous image that the user has intended to capture can be recorded. Further, the surrounding area of less relevance can be checked on the basis of the display on the sub-display 20b. The updating rate of the display controller 30 preferably equals the highest updating rate of the area of the image data D21. The updating rate of the area of the image data D22 to be displayed of a lower updating rate is preferably the updating rate of the display controller 30 divided by an integer.

In the embodiment shown in FIG. 4, the control operation described above such as displaying the image in the entire area of the imaging element on the entire screen at a low frame rate while displaying the image in the expanded display area on the entire screen at a high frame rate corresponds to the first display process. Further, a control operation such as displaying the image in the entire area of the imaging element 10, such as on the entire screen, corresponds to a second display process of this embodiment. Further, the image displayed in the regular image display area during the first display process forms a third through-the-lens image of the embodiment.

To summarize, in the embodiment shown in FIG. 4, a user can choose to display in the first display process, in which the expanded image is shown superposed on a background of the entire image and the images are updated at different rates, and the second display process, in which the entire image is shown.

(4) Third Embodiment of Expanded Display

Figure 5:
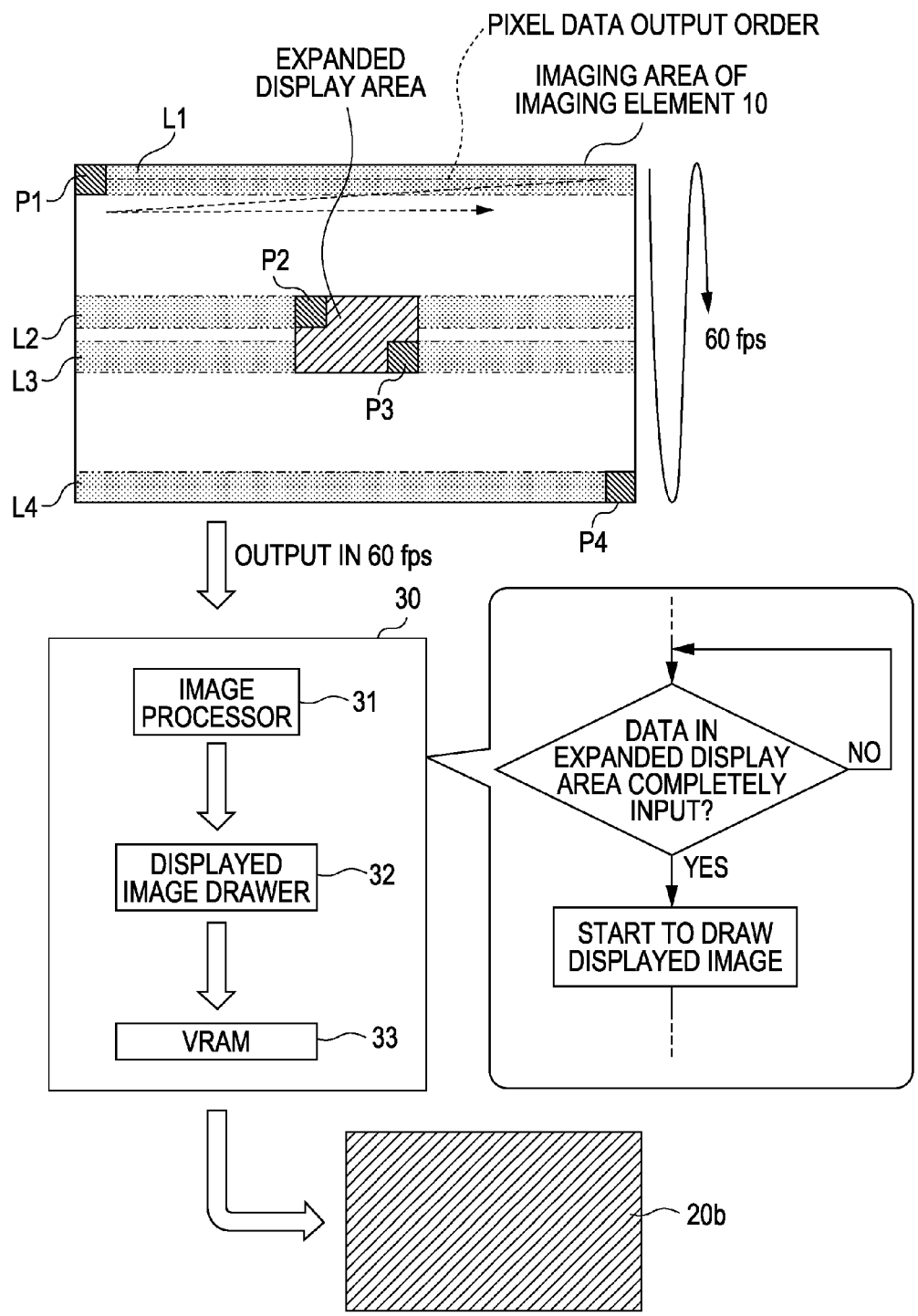
FIG. 5 illustrates a third exemplary embodiment of data flow.

FIG. 5 illustrates a data flow of a third embodiment of an expanded display carried out by the imaging device 100. According to the third embodiment as well, a user does a particular operation on the operation unit 50 so as to view an expanded display area. The display controller 30, however, need not specify the expanded display area for the imaging element 10. The display controller 30 observes data of pixels forming one frame of image data provided by the imaging element 10 on the basis of a single, set expanded display area.

The output data from the imaging element 10 is arranged in order as shown in FIG. 5. That is, data of each of lines is formed by data of a plurality of pixels (pixel data) and the pixel data is output from left to right column order, and each of frames is formed by data of the plural lines (line data) and the line data is output from top to bottom row order. That is, in each of the frames, data of the pixel P1 is output first, and data of the pixel P4 is output last. Line data on the line L1 is output first, and line data on the line L4 is output last. Further, in the expanded display area set in each of the frames, data of the pixel P2 is output first, and data of the pixel P3 is output last. Line data on the line L2 is output first, and line data on the line L3 is output last. Incidentally, left-right or top-bottom relations in the output order of the line data or of the pixel data are exemplary only, and can be suitably changed.

The display controller 30 observes the pixel data and the line data output in the above order, so as to detect timing at which data in the expanded display area is completely input in each of the frames. That is, upon detecting completion of data input of the pixel P3 or of line data input of the line L3, the display controller 30 identifies completion of the input of the data in the expanded display area.

Upon detecting the completion of input of the data in the expanded display area, the display controller 30 makes the displayed image drawer 32 start to draw an image to be displayed and update the VRAM 33 with the drawn image data to be displayed. The display controller 30 moves to a next frame, and starts to input data of the pixel P1. Thus, the timing of updating the displayed image data on the VRAM 33 is earlier for a period of time required between the data input of the pixel P3 and the data input of the pixel P4, or between the line data input of the line L3 and the line data input of the line L4. Thus, the timing of updating the image on the sub-display 20b based on the data on the VRAM 33 is earlier as well, so that the time lag in photographing an object is reduced for the user.

The control operation described above such as detecting completion of input of data in the first data obtaining area and displaying the image of the expanded display area on the display unit corresponds to a first display process of this embodiment. Further, as in the other exemplary embodiments, a control operation such as displaying an image on the display unit on the basis of an image signal in which a starting position for reading each frame, e.g. pixel P1, corresponds to a second display process of the embodiment.

(5) Fourth Embodiment of Expanded Display

Figure 6:
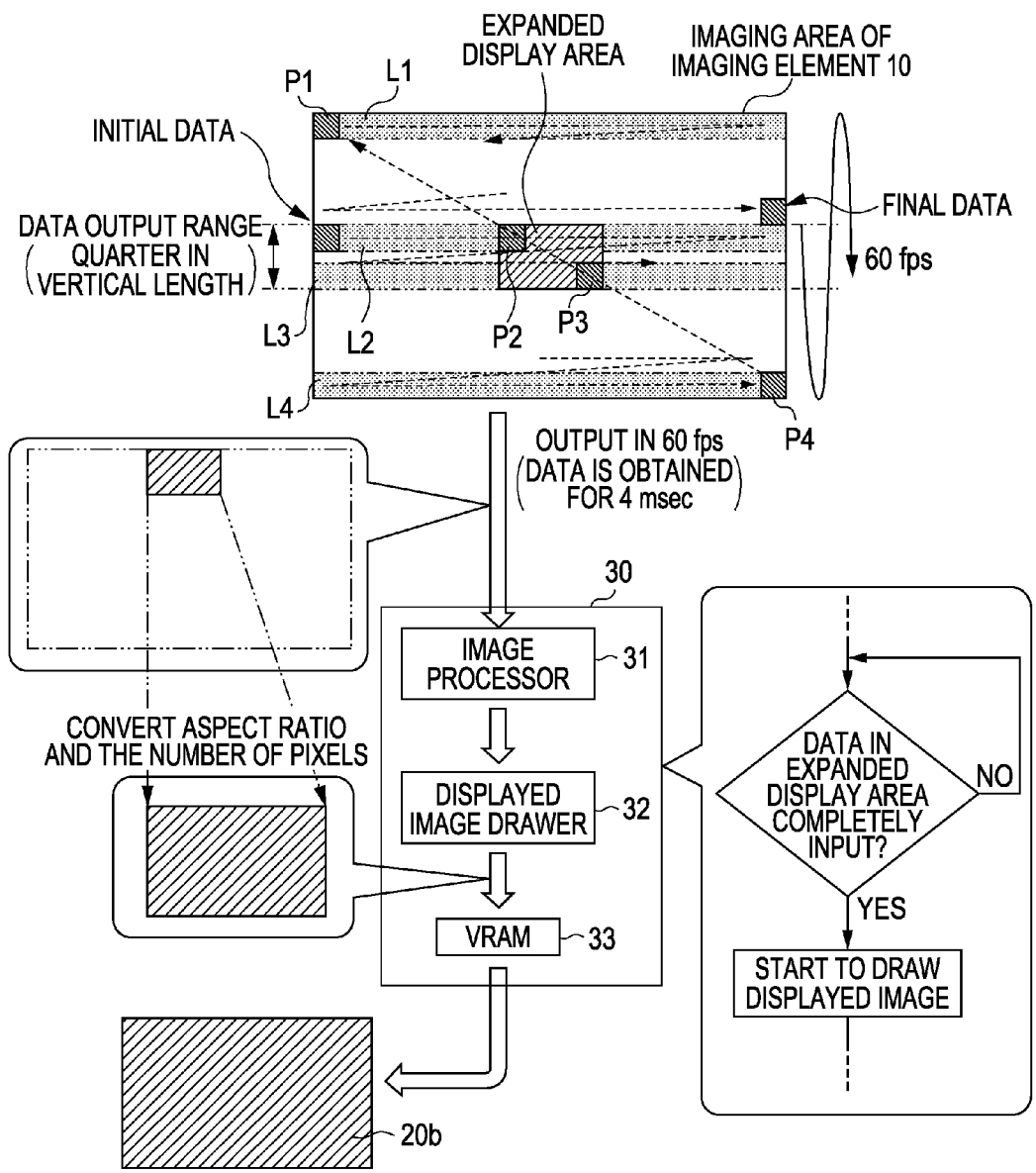
FIG. 6 illustrates a fourth exemplary embodiment of data flow.

FIG. 6 illustrates a data flow of a fourth exemplary embodiment of the expanded display carried out by the imaging device 100. According to this embodiment as well, a user does a particular operation on the operation unit 50 so as to view an expanded display area. Further, the display controller 30 instructs the imaging element 10 to specify or change the expanded display area similarly as for the first embodiment, and the imaging element 10 further outputs an image signal coming from an area other than the data output range of the expanded display area. The imaging element 10 outputs image data of one frame starting from the initial data of the data output range, i.e. outputs data corresponding to the expanded area first.

FIG. 6 shows pixels and lines given the same reference numerals as those of the third embodiment. According to the fourth embodiment, as shown in FIG. 6, the line data of the line L2 including the pixel P2 is output at first. Then, the line data of the lines L2-L3 is output, followed by the line data of the lines L3-L4. Further, return to the line on the upper end. The line data of the lines L1 through the line immediately above L2 is output, and the output of image signals of one frame is completed. Thus, the data of the data output range is given at the front of data of each frame which the imaging element 10 outputs.

Then, similarly as the third embodiment, the display controller 30 observes the pixel data and the line data so as to detect timing at which data in the expanded display area is completely input in each of the frames. Upon detecting completion of the input of the data in the expanded display area, the display controller 30 makes the displayed image drawer 32 start to draw an expanded image. Upon detecting completion of the input of the data included in the lines L4 and L1, the display controller 30 synthesizes images of the lines L1 and L4 above and below the drawn expanded image, respectively, so as to produce image data to be displayed. Further, upon completing the output of the data of the line L1, the display controller 30 starts to output the data of the line L2. Upon completing the image data to be displayed, the display controller 30 updates the VRAM 33 with the completed image data to be displayed and displays the image on the sub-display 20b. That is, upon detecting completion of the input of the data of the pixel P3 or of the line data of the line L3 on each frame, the display controller 30 identifies completion of the input of the data in the expanded display area. According to the fourth embodiment, as described above, if the frame rate is 60 fps and the data output range occupies one quarter of the total image in the vertical direction, e.g., the displayed image drawer 32 starts to draw the expanded image in a short period of 4 ms. The displayed image data stored in the VRAM 33 is thereby updated no later than 12 msec earlier as compared with starting to draw the displayed image after one entire frame is input, as is the case in the embodiment shown in FIG. 5. Thus, the time lag in photographing an object is further reduced for the user.

The control operation described above such as selecting the starting position for reading each frame as the front of the first data obtaining area P2, and displaying the image of the expanded display area on the display unit after completing the input of the data in the first data obtaining area corresponds to a first display process of the embodiment. Further, as usual, a control operation such as displaying an image on the display unit on the basis of an image signal in which a starting position for reading each frame is obtained as an initial pixel P1 in the imaging area of the imaging element 10 corresponds to a second display process of this embodiment.

(6) Overview

According to the embodiments described above, the display controller 30 can obtain signal electric charges only from the pixels in the first data obtaining area of the imaging element 10 in, e.g., 100 fps, and can display an expanded image on the sub-display 20b on the basis of the obtained signal electric charges. Further, the display controller 30 can obtain signal electric charges from the pixels in the entire area of the imaging element in, e.g., 60 fps, and can display a non-expanded image on the sub-display 20b on the basis of the obtained signal electric charges. Then, if a particular operation is done on the operation unit 50 by a user, the display controller 30 can switch between an expanded image displayed at relatively high speed and a non-expanded image displayed at relatively low speed which allows checking the entire layout at the time of photographing the object. The user can thereby select a display which reduces the time lag between the image displayed on the display unit and the truly recorded image, so that the user rarely fails to photograph the object at precisely desired timing.

The invention is not limited to the embodiments or modifications described above, but includes embodiments in which the respective elements disclosed are replaced with one another or omitted, configurations in which similar elements not specifically disclosed replace the exemplary elements, etc. The display unit 20, e.g., can work in synchronization with the frame rate for obtaining signal electric charges, and can display an image at the same frame rate. Meanwhile, content displayed on the display unit can be updated at different rates in accordance with the frame rate at which signal electric charges are obtained as content in the VRAM is updated at different rates in accordance with the frame rate at which signal electric charges are obtained, while the frame rate of the display unit 20 is kept constant. The frame rate of the display unit 20 is preferably, though not necessarily, a common multiple of frame rates at which signal electric charges are obtained in respective modes, so that a display delay can be prevented. Further, the frequencies each are not limited to what is described above.

Further, in order that an image signal is read from the imaging element 10, the image signal can be read from all the pixels in a target area of the imaging element 10, or from only some pixels in the target area, such as evenly distributed pixels.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

A recitation of "a", "an" or "the" is intended to mean "one or more" unless specifically indicated to the contrary.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure.

All patents, patent applications, publications, and descriptions mentioned above are herein incorporated by reference in their entirety for all purposes. None is admitted to be prior art.

What is claimed is:

1. An imaging device for producing image data on the basis of a plurality of signals transmitted from an imaging element, the imaging device comprising:
    a display unit for displaying an image; and
    a display controller configured to carry out a plurality of display processes, the plurality of display processes comprising at least a first and second display process,
    the first display process comprising:
        obtaining a first signal from a first area of the imaging element at a first frame rate, and
        displaying a first through-the-lens image on a first portion of the display unit on the basis of the first signal;
    the second display process comprising:
        obtaining a second signal from the first area of the imaging element at a second frame rate, wherein the second frame rate is lower than the first frame rate;
        obtaining a third signal from a second area of the imaging element at the second frame rate, wherein the second area of the imaging element is different from the first area of the imaging element; and
        displaying a second through-the-lens image on the display unit on the basis of the second and third signals;
    wherein the first display process further comprises:
        displaying a third through-the-lens image on a second portion of the display unit on the basis of the third signal, wherein the third through-the-lens image is displayed concurrently with the first through-the-lens-image;
    wherein displaying the first through-the-lens image comprises displaying the first through-the-lens image at a first update rate, and wherein displaying the third through-the-lens image comprises displaying the third through-the-lens image at a second update rate, wherein the first update rate is higher than the second update rate.

2. The imaging device of claim 1, further comprising a switching unit for switching the display controller between the first display process and the second display process.

3. The imaging device of claim 1, wherein the first through-the-lens image comprises a higher magnification than the second through-the-lens image.

4. The imaging device of claim 1, wherein the display controller starts to obtain the first signal at a position apart from a position at which the display controller starts to obtain the second signal.

5. The imaging device of claim 1, wherein the second through-the-lens image is displayed at a frame rate lower than the first through-the-lens image.

6. The imaging device of claim 1, wherein the second through-the-lens image is displayed at a frame rate equal to the first through-the-lens image, and wherein the second through-the-lens image is less frequently updated than the first through-the-lens image.

7. The imaging device of claim 1, wherein the display controller starts displaying the first through-the-lens image upon finishing obtaining the first signal.

8. The imaging device of claim 1, wherein the first display process further comprises obtaining the first signal from select pixels of the first area of the imaging element, and the second display process further comprises:
    obtaining the second signal from select pixels of the first area of the imaging element, and
    obtaining the third signal from select pixels of the second area of the imaging element.

9. An imaging method for producing image data on the basis of a plurality of signals transmitted from an imaging element, the imaging method comprising:
carrying out one of a plurality of display processes, the plurality of display processes comprising at least a first and a second display process,
the first display process comprising:
obtaining a first signal from a first area of the imaging element at a first frame rate; and
displaying a first through-the-lens image on a first portion of the display unit on the basis of the first signal;
the second display process comprising:
obtaining a second signal from the first area of the imaging element at a second frame rate, wherein the second frame rate is lower than the first frame rate;
obtaining a third signal from a second area of the imaging element at the second frame rate, wherein the second area of the imaging element is different from the first area of the imaging element; and
displaying a second through-the-lens image on the display unit on the basis of the second and third signals;
wherein the first display process further comprises:
displaying a third through-the-lens image on a second portion of the display unit on the basis of the third signal, wherein the third through-the-lens image is displayed concurrently with the first through-the-lens-image;
wherein displaying the first through-the-lens image comprises displaying the first through-the-lens image at a first update rate, and wherein displaying the third through-the-lens image comprises displaying the third through-the-lens image at a second update rate, wherein the first update rate is higher than the second update rate.

10. The imaging method of claim 9, wherein the first display process starts to obtain the first signal at a position apart from a position at which the second display process starts to obtain the second signal.

11. The imaging method of claim 9, wherein the step of displaying the first through-the-lens image starts upon finishing the step of obtaining the first signal.

12. The imaging method of claim 9, wherein the first display process further comprises obtaining the first signal from select pixels of the first area of the imaging element, and the second display process further comprises:
obtaining the second signal from select pixels of the first area of the imaging element, and
obtaining the third signal from select pixels of the second area of the imaging element.

13. A non-transitory storage medium in which an imaging program is stored, the imaging program being capable of carrying out an imaging operation by means of a computer for producing image data on the basis of a plurality of signals transmitted from an imaging element, the imaging program comprising:
a displaying function for displaying an image;
a plurality of display controlling functions comprising at least a first display controlling function for carrying out a first display process and a second display controlling function for carrying out a second display process;
the first display process comprising:
obtaining a first signal from a first area of the imaging element at a first frame rate; and
displaying a first through-the-lens image on a first portion of the display unit on the basis of the first signal;
the second display process comprising:
obtaining a second signal from the first area of the imaging element at a second frame rate, wherein the second frame rate is lower than the first frame rate;
obtaining a third signal from a second area of the imaging element at the second frame rate, wherein the second area of the imaging element is different from the first area of the imaging element; and
displaying a second through-the-lens image on the display unit on the basis of the second and third signals;
wherein the first display process further comprises:
displaying a third through-the-lens image on a second portion of the display unit on the basis of the third signal, wherein the third through-the-lens image is displayed concurrently with the first through-the-lens-image;
wherein displaying the first through-the-lens image comprises displaying the first through-the-lens image at a first update rate, and wherein displaying the third through-the-lens image comprises displaying the third through-the-lens image at a second update rate, wherein the first update rate is higher than the second update rate; and
a selecting function for selecting between the plurality of display controlling functions.

14. The storage medium of claim 13, wherein the first display controlling function starts to obtain the first signal at a position apart from a position at which the second display controlling function starts to obtain the second signal.

15. The storage medium of claim 13, wherein the first display controlling function starts displaying the first through-the-lens image upon finishing obtaining the first signal.

16. The storage medium of claim 13, wherein the first display controlling function further comprises obtaining the first signal from select pixels of the first area of the imaging element, and the second display process further comprises:
obtaining the second signal from select pixels of the first area of the imaging element, and
obtaining the third signal from select pixels of the second area of the imaging element.

* * * * *

UNITED STATES PATENT AND TRADEMARK OFFICE
CERTIFICATE OF CORRECTION

| | | |
|---|---|---|
| PATENT NO. | : 8,964,094 B2 | Page 1 of 1 |
| APPLICATION NO. | : 12/959146 | |
| DATED | : February 24, 2015 | |
| INVENTOR(S) | : Ryuichi Shiohara | |

It is certified that error appears in the above-identified patent and that said Letters Patent is hereby corrected as shown below:

On the Title page, item (54) and in the Specification, Col. 1, line 1, delete

"IMAGING DEVICE, IMAGING METHOD AND

IMAGING PROGRAM FOR PRODUCING

IMAGE DATA ON THE BASIS OF A

PLURALITY OF SIGNALS TRANSMITTED

FROM AN IMAGE ELEMENT"

and insert

--IMAGING DEVICE, IMAGING METHOD AND

IMAGING PROGRAM FOR PRODUCING

IMAGE DATA ON THE BASIS OF A

PLURALITY OF SIGNALS TRANSMITTED

FROM AN IMAGING ELEMENT--

Signed and Sealed this
Eighth Day of September, 2015

Michelle K. Lee
*Director of the United States Patent and Trademark Office*